3,438,673
LUGGAGE RETAINER
Stanford C. Nelson, 8 S. Merrill Ave.,
Park Ridge, Ill. 60068
Filed June 6, 1967, Ser. No. 643,986
Int. Cl. B60r 7/02, 7/08; B61d 45/00
U.S. Cl. 296—37                                                 5 Claims

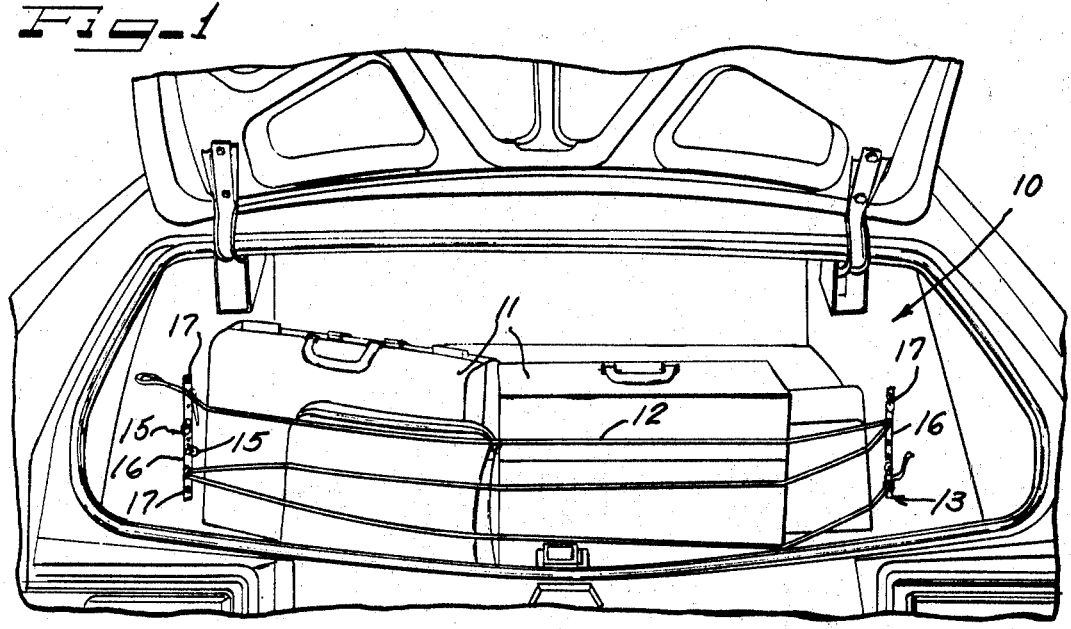
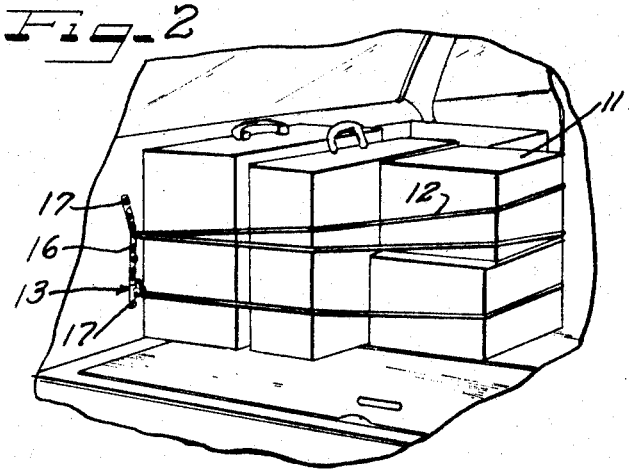
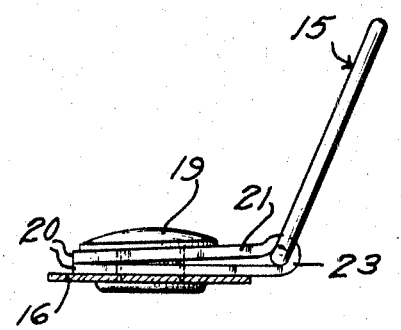
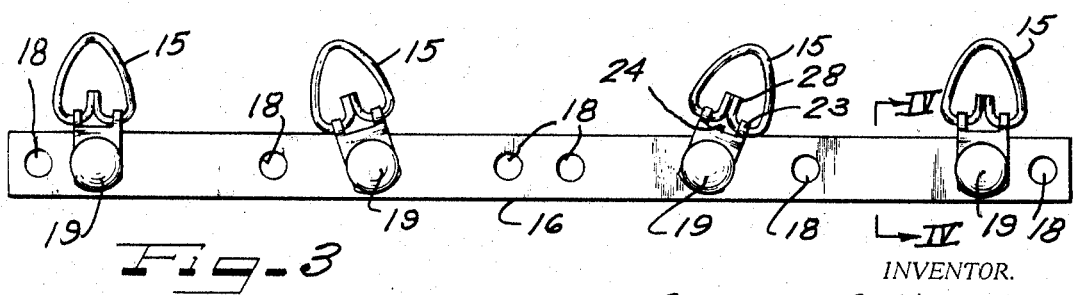
INVENTOR.
STANFORD C. NELSON
BY ATTORNEYS United States Patent Office 3,438,673
Patented Apr. 15, 1969

ABSTRACT OF THE DISCLOSURE

Tie down for trying articles of luggage and the like from shifting along the luggage compartment of an automotive vehicle. The tie down consists of at least two spaced anchor straps made from metal and sufficiently flexible to conform to the configurations of the walls of luggage compartments of various automotive vehicles. The anchor straps are drilled at spaced points for attachment to the wall of the luggage compartment by self-tapping screws or like securing means. Each anchor strap forms an anchoring means for a plurality of spaced anchoring eyes, pivotally connected to the strap between the drilled portions of the strap, for movement in the plane of the strap and also pivotally movable about an axis perpendicular to the plane of the strap and spaced from the axis of pivotal connection of the anchoring eyes to the strap. A flexible tie down, which may be a nylon cord, is laced through the eyes to engage the sides of the articles of luggage and to tie the articles from shifting movement along the deck of the luggage compartment, particularly where the luggage compartment may be partially empty.

Summary of incention and objects

The present invention is directed in particular to a simple and effective tie down means forming an anchoring means for a flexible tie down, which is sufficiently versatile to tie luggage from shifting along the deck of a luggage compartment of an automotive vehicle, when the luggage compartment is partially filled, and to be readily adapted to various forms of luggage compartments, and particularly the luggage compartments of station wagons and the like.

A principal object of the present invention is to provide a simple and improved form of retainer for luggage in the luggage compartment of a vehicle, in the form of anchoring means for a flexible tie member, anchoring the tie member to hold luggage from shifting movement with respect to the luggage compartment of the vehicle.

Another object of the invention is to provide a simple and efficient tie down in the form of a pair of anchoring straps sufficiently flexible to conform to various wall configurations of luggage compartments of automotive vehicles, and forming an anchoring means for a plurality of anchoring eyes, pivotally mounted thereon for movement about axes perpendicular and parallel to the outer plant surface of the anchoring strap, to accommodate the anchoring eyes to conform to a flexible tie member laced thereto.

These and other objects of the invention will appear from time to time as the following specification proceeds and with reference to the accompanying drawings.

Description of the drawings

FIGURE 1 is a perspective view of a luggage compartment of an automotive vehicle with the deck lid open and showing a retainer constructed in accordance with the principles of the present invention, retaining articles of luggage to the back of the deck of the luggage compartment.

FIGURE 2 is a partial fragmentary perspective view of the luggage compartment of a station wagon illustrating the adaptation of the luggage retainer of the present invention to retain articles of luggage to a side wall of the luggage compartment.

FIGURE 3 is a top plan view of an anchoring strap having a series of anchoring eyes universally mounted thereon; and FIGURE 4 is a transverse sectional view taken substantially along line IV—IV of FIGURE 3.

Description of preferred embodiment

In FIGURE 1 of the drawings I have shown a conventional rear deck or luggage compartment 10 of an automotive vehicle with articles of luggage 11 placed in the deck and held from shifting movement along the deck by a flexible tie 12 of a luggage retainer 13.

The flexible tie 12 may be a length of cord, which for strength and durability may be nylon cord, laced through a series of anchoring eyes 15—15 anchored at spaced locations in the luggage compartment, to anchor straps 16—16.

The anchor straps 16 may be made from steel or other metal sufficiently flexible to conform to a wide variation of wall configurations of luggage compartments. Self-tapping screws 17 passing through spaced drilled portions 18, spaced along the anchoring straps 16, are provided to secure the anchoring straps to a wall or walls of the luggage compartment.

The anchoring eyes 15 are mounted on the anchoring straps 16 between the drilled portions 18—18 thereof, on pivot pins 19, shown in FIGURES 3 and 4 as extending through legs 20 of connectors 21 for the anchoring eyes 15. The connectors 21 are shown as being of a generally U-shaped formation in which the legs 20—20 extend from a bight 23 of the connector. The pivot pins 19 may be headed rivets 19 in which the head is spaced from the connectors, a distance sufficient to mount each connector to the anchor strap 16, for relatively free pivotal movement with respect thereto about the axis of the rivet, to accommodate the connectors to freely swivel and thereby conform to the position of the flexible tie 12. As shown in FIGURE 3 the bight portion 23 of the connector 21 is cut away at its center to provide an open central portion 24 of the connector, to receive the adjacent end portions of an anchoring eye 15, and to accommodate said anchoring eye to pivot about an axis parallel to the plane of the outer surface of the anchoring strap 16, to thereby accommodate the eye 15 to conform to the angle of the flexible tie 12.

As shown in FIGURES 3 and 4, each anchoring eye 15 is formed from a length of wire with opposite ends of the length of wire extending through the opposite bight portions 23 into the central open portion 24. The opposite ends of the wire are bent to extend along each other outwardly of the bight portion 23, and to abut each other to positively retain the anchoring eye 15 to the connector 21, and accommodate free pivotal movement of the eye with respect to each connector.

In FIGURE 2 of the drawings I have shown the luggage retainer of my invention retaining a series of articles 11, which may be articles of luggage, to one side wall of the deck portion or luggage compartment of a station wagon. When utilizing the luggage retainer to retain luggage to the deck portion of a station wagon, to prevent the luggage from sliding across the deck, two anchoring straps 16 are anchored to a side wall of the station wagon and the flexible tie is laced back and forth through a selected number of anchoring eyes 15. The flexible tie being laced back and forth through the anchoring eyes 15 and engaging the articles of the luggage 11, may be drawn tightly to engage the articles of luggage, to retain the articles of luggage to the side wall of the luggage compartment, and to thereby prevent the articles from shifting across the luggage compartment, during travel of the vehicle.

It may be seen from the foregoing that a simplified form of retaining means has been provided for preventing the shifting of articles in the luggage compartments of automotive vehicles, where the compartments may not be tightly loaded. The luggage retainer may conform to various configurations of wall portions of a luggage compartment and retain the luggage to the back, side or front walls of the compartment by the simple operation of mounting the anchoring straps in the desired locations in spaced relation with respect to each other, in position to accommodate lacing of the flexible tie through the anchoring eyes 15, to retain the luggage to the desired wall of the luggage compartment, depending upon the location of the anchoring eyes 15.

While I have herein shown and described one form in which the invention may be embodied, it may readily be understood that various variations and modifications in the invention may be attained without departing from the spirit and scope of the novel concepts thereof.

I claim as my invention:

1. In a retainer for articles of luggage and the like, in combination with an automotive vehicle having a luggage compartment, for retaining the articles from shifting along the said luggage compartment,
    at least two flexible anchor straps mounted in the luggage compartment in spaced relation with respect to each other,
    each anchor strap having at least one anchoring eye connected thereto for free universal movement with respect thereto,
    and a flexible tie member laced through said eyes and adapted to engage and retain the articles from shifting along the deck of the luggage compartment.

2. The structure of claim 1,
    wherein the anchoring straps are made of a flexible metal conforming to an irregular wall of the luggage compartment, and
    wherein each anchoring strap has a plurality of spaced anchoring eyes extending therealong.

3. The structure of claim 2,
    wherein the anchoring straps have a plurality of spaced apertured portions accommodating the securement of said anchoring straps to the luggage compartment of a vehicle, and
    wherein the anchoring eyes are connected to said straps between said apertured portions.

4. The structure of claim 2,
    wherein the universal pivotal mounting of each anchoring eye to the associated anchoring strap comprises a connector having a rounded bight and legs extending therefrom into close engagement with each other,
    wherein a pivot member extends through said legs and the associated anchoring strap to pivotally secure said connector to said anchoring strap, and
    wherein the anchoring eye extends through the bight of said connector and is attached thereto for pivotal movement with respect thereto about an axis perpendicular to the axis of said pivot mounting member, and spaced laterally therefrom.

5. The structure of claim 4,
    wherein the bight of the U-shaped strap is cut away intermediate its ends to provide spaced bight portions,
    wherein the anchoring eye is formed from a length of wire and has opposite end portions extending through said bight portions and into the space therebetween, and
    wherein the end portions of said anchoring eye are bent to extend generally perpendicular to the axis of connection of said eye to said connector and outwardly of the bight portion of said connector, to positively secure said eye to said connector.

References Cited

UNITED STATES PATENTS

| | | | |
|---|---|---|---|
| 2,723,631 | 11/1955 | Allen | 105—369 |
| 2,756,693 | 7/1956 | Frost | 105—369 |

PHILIP GOODMAN, *Primary Examiner.*

U.S. Cl. X.R.

105—369